H. E. DOERR.
TRUCK SIDE FRAME.
APPLICATION FILED APR. 10, 1918.
1,380,782. Patented June 7, 1921.
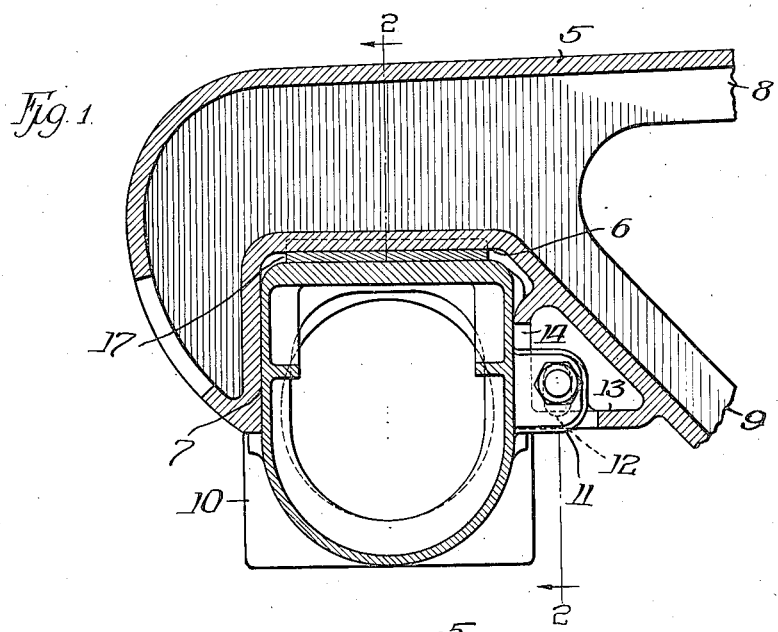
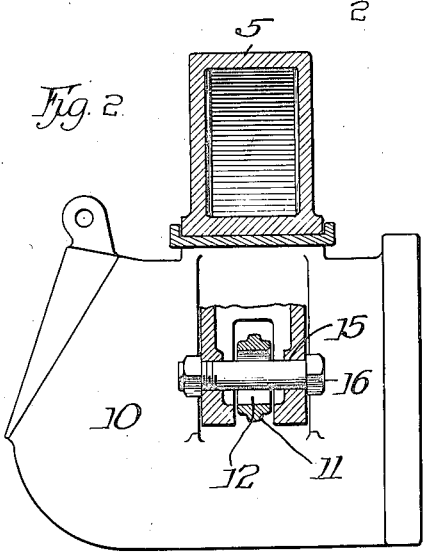
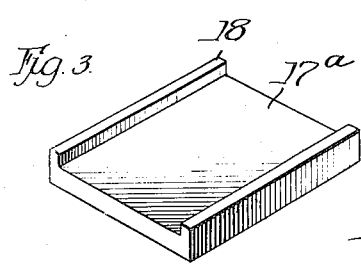
Witnesses:
Inventor:
Harry E. Doerr
By Wilkinson & Huxley
Attys

UNITED STATES PATENT OFFICE.

HARRY E. DOERR, OF ST. LOUIS, MISSOURI, ASSIGNOR TO SCULLIN STEEL CO., OF ST. LOUIS, MISSOURI, A CORPORATION OF MISSOURI.

TRUCK SIDE FRAME.

1,380,782.   Specification of Letters Patent.   Patented June 7, 1921.

Application filed April 10, 1918. Serial No. 227,648.

*To all whom it may concern:*

Be it known that I, HARRY E. DOERR, a citizen of the United States, residing at St. Louis, and State of Missouri, have invented certain new and useful Improvements in Truck Side Frames, of which the following is a specification.

My invention refers to side frames for car trucks.

One of the objects of my invention is to arrange the journal boxes with respect to the side frames to maintain the coupler at proper height under various conditions of wear imposed on the truck wheels.

Another object is to do away with the necessity of furnishing a car truck at the time it is built with temporary parts such as shims to be removed from time to time to compensate for wheel wear.

Another object is to provide means in a car truck for compensating for the reduced diameters of steel wheels when the latter are trued after a period of service.

Another object is to provide a compensating means between said frames and journal boxes in a car truck eliminating the necessity of introduction of shims due to the wear of the wheels until needed.

A still further object is to provide connections between truck pedestals and the journal boxes to permit installation of shims to compensate for wear as needed.

A further object is to provide a novel journal box connection to permit vertical adjustment between the box and the side frame and for application of shims of varying thicknesses as required and to eliminate the necessity of carrying shims before needed.

I accomplish these and other objects by providing an adjustable connection between the truck side frame and the journal boxes, such as an ear on the side frame for coöperation with the slotted lug on the journal box and a bolt passing through the apertures to retain the journal box in position on the side frame. By reason of the provision of such adjustable connections, it is possible to vary the vertical relation between the journal box and the truck pedestal by introduction of shims above the journal box to maintain the coupler at its proper height.

The present practice of compensating for wheel wear especially steel wheels, is to build the side frame with a member or tie bar extending underneath the journal box and spaced therefrom by interposed removable shims. In the course of several years, the wheels wear to such an extent as to make truing necessary, which truing reduces the diameter of the wheels, and would result in a lowering of the coupler, if provision were not made to compensate for such reduction in wheel diameter. Usually, one of the shims below the journal box is removed and interposed between the top of the journal box and the truck pedestal. Then, after another period of years the wheels are again trued making necessary transfer of another shim from below the journal box to the top thereof. This arrangement requires that every truck be provided with at least eight shims at the time the truck is built and applied to the car, which shims increase the weight of the truck, the cost thereof and the weight to be pulled by the locomotive. It is the object of my invention to overcome the use of shims before needed and I accomplish this as hereinafter more fully described.

To more fully understand the nature of my invention attention is directed to the drawings wherein,—

Figure 1 is a fragmentary vertical section through a cast steel frame showing the application of the preferred form of my invention, Fig. 2 is a section on line 2—2 of Fig. 1, and Fig. 3 is a perspective view of the preferred form of shim employed.

For the purpose of illustrating my invention I have shown a portion of a truck side frame 5 which is preferably box like in section and is provided with a truck pedestal 6 comprising at one side a downwardly depending jaw 7. The side frame includes the usual compression and tension members 8 and 9, respectively. The journal box 10 is of usual construction except that one side is provided with a projecting lug 11 having a vertically disposed elongated slot 12 therein. The truck frame is provided with a box like portion 13 having a hollow interior and provided with a recess 14 adapted to receive the ear 11. A bolt hole 15 is provided therein for the reception of a bolt 16. When the car is built and put into service the truck pedestal 6 rests directly on top of the journal box 10, the bolt 16 passing through the apertures 15 and the elongated slot 12 in the lug 11, on the journal box. This arrangement permits the journal box to be secured to the truck frame for adjustment and removal with respect thereto.

When necessary to true the wheels of the truck the removal of metal from the wheels is compensated for by the provision of a shim 17 between the top of the journal box 10 and the truck pedestal 6, the thickness of the shim being made to correspond to the amount of metal cut from the wheels to maintain the coupler at its proper height. Preferably, the shim is made with edge walls 18 for embracing the frame as shown in Fig. 2, and retaining same in position. The provision of the elongated slot 12 in the lug 11 permits the journal box to be moved vertically relatively to the truck frame and still function properly. Then after another period of time more metal being taken from the wheels a thicker shim 17ª is introduced, the thickness of this shim corresponding to the thickness of the first shim plus the decrease in the diameter of the wheel due to the amount of metal cut from the wheel the second time. If occasion demands a third truing a third shim of proportionate thickness may be provided.

It is obvious that by using such an arrangement it will be unnecessary to load the trucks with useless material at the time of building but that when the trucks are being overhauled and the wheels trued, the proper size of shim may be applied, the thickness of the shim being made to correspond to the reduced diameter of the wheels. This results in a saving in the original cost of the trucks and in avoiding initially adding useless weight. It also means that only enough shims are needed to fill the requirements at any particular truing of the wheels. The shims are easy to make and do not have to be carried in stock in great quantities as this can be made at any time and supplied whenever needed. Furthermore, the provision of such a connection between the journal box and the truck frame does away with the necessity of the underlying tie bar required by the present practice. It will be observed that this construction imparts a better appearance to the side frame and affords a convenient way of providing means for compensating for the wear of steel wheels without the necessity of initially overburdening the trucks with useless parts.

I am aware that modifications of such a device may be made and I intend to include such modifications as come within the scope of the appended claims.

I claim:

1. In combination, a truck side frame having a pedestal jaw with apertured spaced walls, a journal box having a lug with a vertically elongated slot and extending between said walls, said frame and box being relatively adjustable, and a bolt connecting the walls and lug, said connection permitting shims of varying thickness to be inserted between the journal box and truck pedestal to vary the relative position therebetween.

2. In combination, a truck side frame having a pedestal jaw with apertured spaced walls, a journal box having a laterally extending arm with a vertically arranged elongated slot, and means extending through said apertured spaced walls and elongated slot connecting said side frame and journal box to permit shims of varying thickness to be inserted between the journal box and truck pedestal for varying their relative positions.

Signed at St. Louis, State of Missouri, this 29th day of March, A. D., 1918.

HARRY E. DOERR.